Aug. 18, 1959 H. H. MUELLER 2,900,192
TONE ARM CONTROL FOR THE FULLY AUTOMATIC OR MANUALLY
CONTROLLED PLAYING OF INTERMIXED RECORDS
Original Filed July 10, 1953 5 Sheets-Sheet 1

Herman H. Mueller
INVENTOR.

BY
Attorneys

Herman H. Mueller
INVENTOR.

Fig. 16

Herman H. Mueller
INVENTOR.

United States Patent Office

2,900,192
Patented Aug. 18, 1959

2,900,192

TONE ARM CONTROL FOR THE FULLY AUTOMATIC OR MANUALLY CONTROLLED PLAYING OF INTERMIXED RECORDS

Herman H. Mueller, Ephrata, Pa., assignor of small interests to various assignees Original application July 10, 1953, Serial No. 367,316, now Patent No. 2,841,400, dated July 1, 1958. Divided and this application November 4, 1954, Serial No. 476,732

11 Claims. (Cl. 274—10)

This invention is a division of my prior copending application which has now matured into Patent No. 2,841,400 of July 1, 1958, and comprises novel and useful improvements in a tone arm control for playing intermixed records of various standard sizes and speeds of rotation, and more specifically relates to a tone arm having associated therewith an indexing means for gauging or detecting the size of a record in an intermixed stack containing records of several different sizes, and in response to such detection properly positioning the tone arm at the beginning of the sound track for playing that record, and all in a fully automatic manner and selectively in any one of a variety of sequences of automatic playing.

Another object of this invention is to provide a mechanism for selectively positioning or indexing a tone arm at the beginning of a record sound track to play the bottom and top sides of each record of a stack of intermixed records in a continuous sequence; or to play either the top sides or bottom sides only of a stack of intermixed records in sequence; or to play manually the top sides only or the bottom sides only of a stack of intermixed records in sequence while supporting and driving the record being played above or selectively upon a turntable; or to play manually and singly on the turntable, records of different sizes.

A further object of the invention is to provide a tone arm control mechanism in accordance with the preceding objects which shall be specifically adapted for use in the dual phonograph record player of the type set forth in my prior co-pending application, Serial No. 347,507 and my other prior copending applications which have now matured into Patents Nos. 2,729,455; 2,809,841; 2,809,-843; 2,837,337; 2,809,840.

A further specific object of the invention is to provide a tone arm control mechanism having associated therewith an indexing mechanism comprising a gauging and indexing device which shall detect and respond to records of different sizes in an intermixed stack of records and control the horizontal movement of the tone arm and index the same in accordance therewith, and wherein the gauging device is automatically retracted into a nongauging position upon the tone arm except during the gauging operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

The novel tone arm gauging mechanism set forth and claimed hereinafter has been illustrated in the accompanying drawings as applied to a dual phonograph record player of the type set forth in my prior co-pending application Serial No. 347,507, filed April 8, 1953, and for automatic speed and needle changer control for playing interlocking records. It will be appreciated, however, that although the gauging device has been shown as applied to this particular type of phonograph record player, that the principles of the invention are not limited thereto but may be practiced with a variety of different constructions of phonograph record players as will be more readily apparent.

Automatic record players of the type with which the present invention is primarily concerned have a movement for imparting horizontal swinging motion to the tone arm for moving the tone arm between a rest position at one side of the record and a playing position upon the record, for causing the tone arm to actuate the associated record changer mechanism of the record player, upon completion of the playing of a record; a movement for imparting vertical movement to the tone arm; and in some instances, a movement for imparting tilting motion to the tone arm. These movements are operated in timed relation to each other to enable the tone arm to perform its various motions and functions during its operation. The present invention disclosed and claimed hereinafter is adapted for incorporation into and use with these three movements.

General organization

The automatic record player and changer illustrated in the accompanying drawings is of the dual record type, and includes a cabinet or casing 10 having top and bottom walls 12 and 14. Rotatably mounted upon the top of the cabinet is a turntable 16 which may be of any suitable construction and mounting, and is driven in any desired manner from a uni-directional constant speed motor, not shown, as disclosed for example, in my prior Patents Nos. 2,559,786; 2,729,455; 2,809,843; and 2,837,337.

Figure 2:
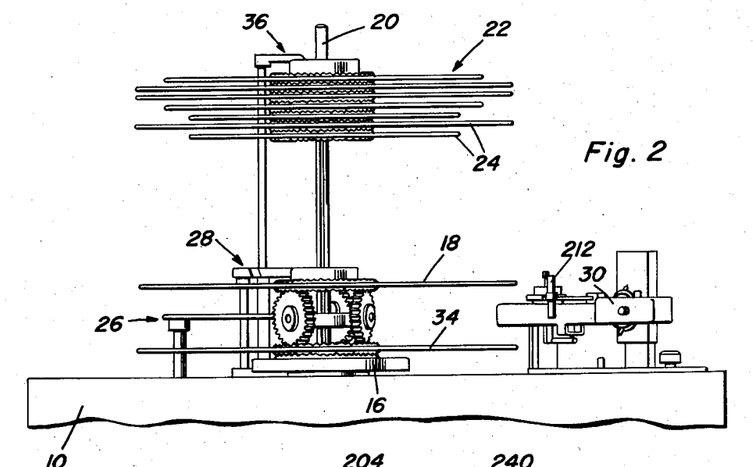
Figure 2 is a fragmentary side elevational view of a phonograph record player in accordance with Figure 1, the parts being in the position shown in Figure 1.

There is further illustrated a stationary spindle 20 having means for supporting a stack 22 of intermixed records 24 of different sizes to be released successively in any desired manner from the stack for playing. These records are preferably of the interlocking non-slipping type disclosed in the above mentioned applications and patents. A record supporting and driving assembly 26 is shown in Figure 2 and this is preferably of the type disclosed in my prior Patents Nos. 2,729,455; 2,809,843; 2,837,337; 2,809,840. The assembly 26 serves to support a record 18 above the turntable and to drive the record from the turntable but in the opposite direction of rotation to permit the tone arm to play the underside of the record.

The pressure arm assembly 28 is employed to maintain the record 18 being played in firm non-slipping contact with the means 26, the turntable 16 or the records 34 carried by the turntable, and may be of the character disclosed in my prior Patents Nos. 2,729,455 and 2,837,337.

A tone arm 30 is also provided with a record gauging or indexing device, as set forth hereinafter, and may include the features set forth and claimed in my prior Patent No. 2,809,841. In particular, the tone arm 30 includes a needle changer assembly 32 of the construction claimed in Serial No. 347,507, and a tone arm support post of a particular construction to be set forth hereinafter; or in some instances which may be of the same or of a similar construction to that shown in Patent No. 2,809,841.

Also, illustrated in the drawings, is a stack weight assembly 36 which may be of the construction and operation disclosed in application Serial No. 347,507.

Both the vertical and horizontal movements actuate the tone arm by an operative connection with the tone arm support post. In addition, to these movements, there is a further mechanism or movement for selectively tilting the tone arm upwards or downwards upon its support, when the tone arm is positioned between the records 18 and 34, whereby to position the needle assembly in playing position upon either the top sound track or the sound track on the under surface of a record 18 mounted upon the supporting and driving assembly 26 or the sound track on the upper surface of a record 34 resting upon the turntable or the stack of records accumulated upon the turntable; or above the record 18 when playing the top surface of a record positioned upon the supporting and driving assembly 26. This mechanism or movement is known as the tilting movement and is disclosed in my prior Patent No. 2,841,400 but since the invention claimed herein is not dependent upon such mechanism, an illustration and description of the same is omitted as superfluous.

The horizontal, vertical and tilting movements are operated by the motor, not shown, in proper correlation to each other and to the other movements of the record player by the mechanisms or movements to be described fully hereinafter.

The tone arm assembly includes a gauging or indexing device, two forms being illustrated and described hereinafter, which detect the size of a record to be played and then adjust the horizontal movement accordingly so that the tone arm will be indexed or set down upon the sound track of the record at the proper point despite variations in the size of successive records. These gauging devices are likewise described fully hereinafter.

Tone arm mounting and support

A novel mounting and support structure is provided for the tone arm whereby the latter may be reciprocated vertically under the control of the vertical movement; may be tilted about a horizontal axis under the control of the tilting movement; and may be rotated horizontally about a vertical axis by the horizontal movement.

Figure 4:
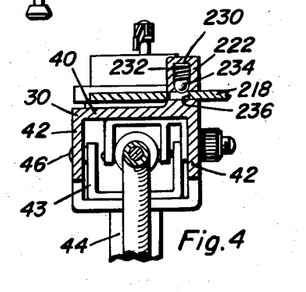
Figure 4 is a detail view taken upon an enlarged scale in vertical transverse section substantially upon the plane indicated by the section line 4—4 of Figure 3 and showing certain structural features of the gauging device and its association with the tone arm.
Figure 5:
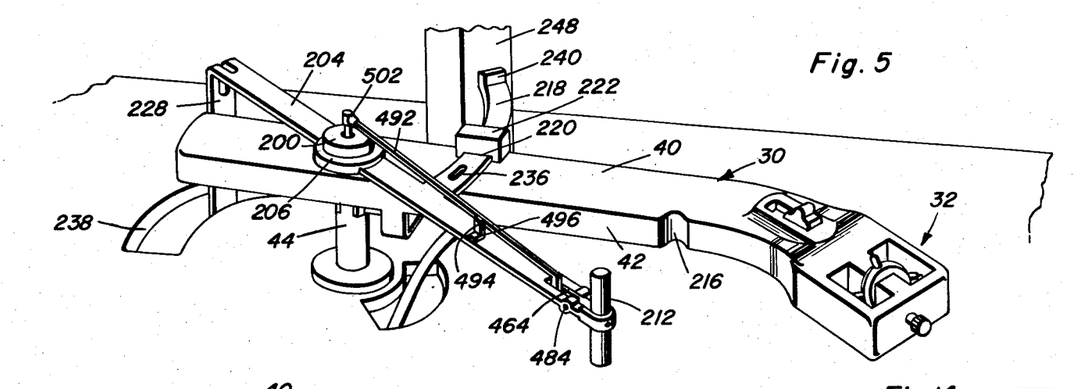
Figure 5 is a perspective view of the tone arm assembly showing the gauging blade in position for a gauging and indexing operation.

As seen best in Figures 4 and 5, the tone arm 30 has a flat top wall 40, a pair of flat parallel side walls 42 and an open bottom, being pivoted for vertical tilting to the furcations 43 on the upper end of a vertically extending tubular support post 44, by horizontal trunnions or pins 46. As set for in Patent No. 2,841,400, the support post is caused to move vertically by the vertical movement and to rotate or oscillate about its vertical axis by the horizontal movement, carrying with it the tone arm which is also capable of an independent vertical tilting about the horizontal axis of the pins 46.

By a compensating mechanism set forth in detail in my Patents Nos. 2,841,400; 2,809,841 and my prior application Serial No. 359,082; the support post and tone arm are automatically vertically elevated step-by-step, each time a record is played and changed in order to compensate the vertical position of the tone arm for the accumulating stack of records upon the turntable whereby the tone arm and its stylus will always be at the same relative vertical position with respect to a record being played thereby. The construction and operation and improved form of this compensating mechanism and its driving means form no part of the invention claimed hereinafter and therefore are omitted.

Figures 8, 9:
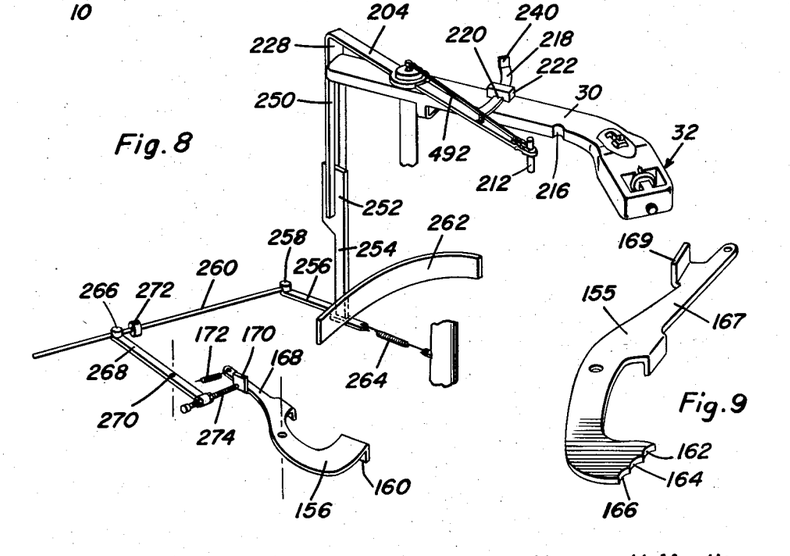
Figure 8 is a diagrammatic view in perspective of the gauging and indexing mechanism and the manner in which it is connected with the tone arm and the limit lever forming a part of the horizontal movement.
Figure 9 is a perspective view of a modified form of limit lever forming a part of the horizontal movement.

The horizontal movement of this invention, in accordance with the conventional horizontal movement of record players in general, also includes a horizontal swing lever, not shown, attached to and movable with the lower end of the support post 44, and which cooperates with a limit lever 156, see Figure 8, which is pivotally supported for horizontal swinging. This lever, at one end portion, is provided with a flange 160 which is adapted as set forth hereinafter to be selectively positioned for engagement by a projecting pin of the horizontal swing lever, whereby the limit lever, by engagement of the pin against the flange will limit travel of the swing lever towards the center of the horizontal movement cam, not shown, by which the horizontal swinging of the tone arm is controlled. This limiting of the limit lever upon the horizontal swing lever serves to position or index the stylus of the tone arm for proper setting down upon the sound track of a record for beginning the playing of that sound track.

In the conventional limit lever construction, there are two stop recesses, corresponding to the positioning or indexing of a tone arm for playing two sizes of records, as for example, 10 inch and 12 inch records. In accordance with this invention, however, the flange 160 permits a very large number of settings to properly index or position the tone arm stylus for selectively playing seven inch, ten inch, or twelve inch records, or any size of records.

In the modified form of limit lever 155 illustrated in Figure 9, there are provided, in lieu of the flange 160 of the lever 156, a plurality of stop notches or recesses, one for each size of record for which it is desired to index the tone arm, as for example, the notches 162, 164, and 166 for seven inch, ten inch or twelve inch records respectively. The functioning of the modified limit lever 155 is identical with that of the limit lever 156, except that the former can index the tone arm for only those sizes of records for which the notches are provided, while the latter by its flange 160 can accommodate a varying number of sizes of records.

The other or actuated ends 167, 168, of the levers 155, 156, respectively, are modified from the conventional construction by the addition thereto of actuated flanges 169 and 170, by which the limit levers are adjustably actuated by a gauging or indexing mechanism set forth hereinafter.

It will be seen that although the horizontal swing lever is unaltered from conventional design, the limit lever is modified from conventional design by the addition of the abutments or stops at one end and by the provision of an actuated flange at the other end.

At its extremity, each form of the limit lever has attached thereto a tension spring 172 suitably secured in any desired manner whereby the limit lever is urged into a position for causing a selected one of the notches or recesses to engage the pin on the horizontal swing lever; or to cause an appropriate portion of the flange 160 to perform its same function. Thus, either form of limit lever 155 or 156, serves to index the tone arm for playing a record.

*Gauging and indexing device*

In order that the record player in accordance with this invention may automatically play a stack of intermixed records of different sizes, there is provided a gauging and indexing device which gauges or determines the size of the next record to be played by the tone arm, and in response to and in accordance with the gauging operation adjusts the limit lever to properly position or index the tone arm for its set down upon the sound track of the record at the beginning of the same.

Figures 6, 7:
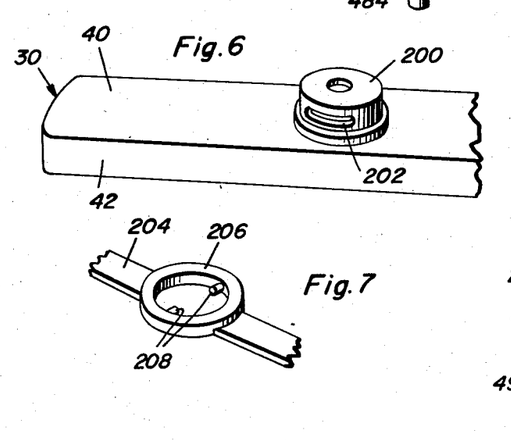
Figure 6 is a fragmentary perspective view of a portion of the tone arm showing the means for pivotally mounting the gauging blade thereon.
Figure 7 is a fragmentary perspective view of a portion of the gauging blade of the tone arm, showing the pivot means whereby the same is secured to the tone arm.

Referring now more particularly to Figures 5, 7 and 8, it will be seen that the tone arm 30 upon its top wall 40, is provided with an upstanding drum or cylindrical member 200, which upon opposite sides is provided with peripheral grooves 202. A gauging blade in the form of an elongated, generally flat strip 204 is provided in its intermediate portion, as shown more clearly in Figure 7, with an annulus 206 which is rotatably received upon the cylindrical member 200 and is provided with diametrically disposed pins 208 which extend into the annulus and are received in the grooves 202, previously mentioned. These pins may be screw-threaded into the annulus for ready application to or removal therefrom. By means of these pins, the annulus and the gauging blade are secured to the cylindrical member 200 for horizontal swinging movement thereon, the gauging blade resting and sliding upon the top wall 40.

At what may be termed its front or gauging end, the gauging blade 204 is provided with a vertically disposed gauging element, which may conveniently take the form of a pin or roller 212 while at its rear end the blade is provided with a downwardly extending arm 228. The gauging pin extends above and below the tone arm and is automatically vertically reciprocated and adjusted for an operation and in a manner to be subsequently set forth, and the side wall 42 of the tone arm which is adjacent the turntable is provided with a cylindrical recess 216 adapted to receive this pin when the gauging blade is moved into a collapsed position against the tone arm at the completion of the gauging operation, as in Figure 3.

Extending laterally from the gauging blade 204 between its anulus 206 and the gauging pin 212 and from what may be termed the rear or non-gauging side of the blade is an arcuately extending member 218 constituting a guide. As shown in Figure 8, the guide 218 extends through a transverse guide slot 220 provided in the lower end of a bracket 222 which is secured to and rises from the top wall 40 of the tone arm.

As will be apparent by reference to Figure 4, the bracket 222 is provided with a chamber 230 in its upper portion which opens into the slot 220. This chamber receives a compression spring 232 which urges a detent ball 234 downwardly against the arcuate guide 218. As an appropriate position along its length, the arcuate guide is provided with appropriately spaced slots or apertures 236 and 226 which are each adapted to receive the detent ball 230 to thereby resiliently and yieldably retain the guide in a predetermined position, these being the collapsed or reset position of the device shown in Figure 3, or the extended or reset position of the gauging blade when the latter is ready to begin its gauging operation, as in Figures 1, 5 and 8.

At its extreme outward end, the arcuate guide 218 is provided with a flange 240 which is adapted for actuation by a reset abutment.

Rising from the top wall 12 of the cabinet is a standard 244 having a screw 246 threaded therethrough. The screw is threadedly engaged with the standard, and is rotatably but non-threadedly engaged with a channel-shaped member 248 constituting an adjustable abutment. This abutment is positioned for engagement by the flange 240 of the arcuate guide 218, and is so positioned that when the tone arm moves or is swung horizontally away from the turntable and records and toward the idle or reset position of the tone arm, the flange will strike the abutment whereby the final movement of the tone arm away from the turntable will result in pushing the arcuate guide from the collapsed position of Figure 3 outwardly from the tone arm into the gauging position of Figure 1. During this movement of the guide, the slot 226 of the gauge blade guide 218 is disengaged from the detent ball, and the detent aperture 236 of the gauge blade guide is moved into engagement with the detent ball. The gauging blade is thus resiliently secured in its reset position in readiness for the next gauging operation.

Figure 1:
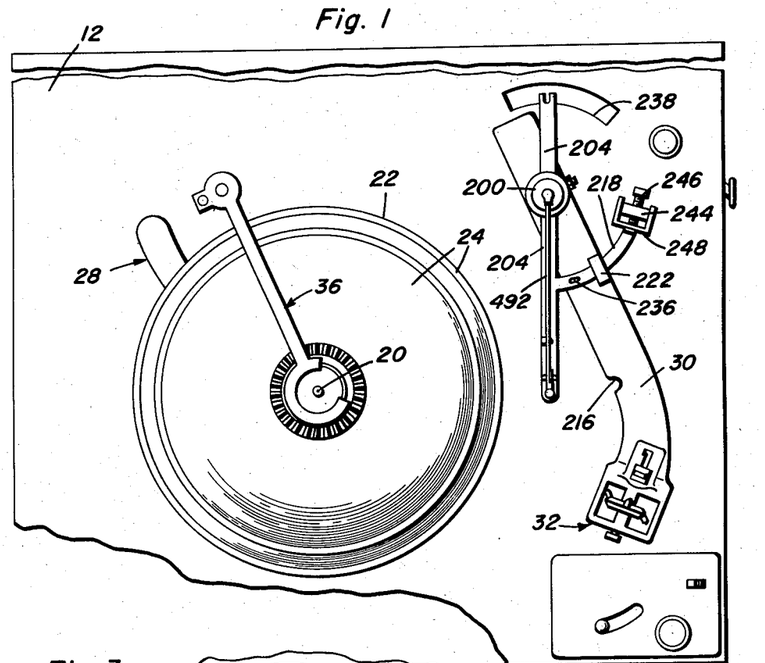
Figure 1 is a fragmentary top plan view of a phonograph record player including a tone arm incorporating therein a gauging and indexing device in accordance with this invention, the gauging device being shown in the position which it assumes after having been reset for the next gauging operation.

Referring more especially now to Figures 1, 2 and 5, it will be observed that the top wall 12 of the cabinet has an arcuate slot 238 therethrough to permit passage of the gauging blade arm 228 during arcuate movement of the latter in response to movement of the tone arm. The gauging blade arm 228 is adapted for operative connection with the tone arm limit lever 155 or 156 previously mentioned in a manner to be now described.

Attention is now directed generally to Figure 2 and more specifically to Figures 5, 8, 14, and 15 for a more complete understanding of the gauge pin 212 and its mounting and operating mechanism. The gauge blade 204 has a longitudinal slot 464 at its forward end and a vertical bore 466 intersects this slot. The gauge pin 212 is slidably received in the bore 466, has an axial chamber or bore 468 opening from one end, which chamber is closed by threaded plug 470.

A longitudinal slot 472 is provided in the pin 212 communicating with the chamber 468 and a retainer pin 474, carried by and extending inwardly from the end of blade 204, is disposed through the slot 472 and into the chamber 468 to retain the pin in its vertical bore 466 and prevent rotation thereof. The pin also constitutes a seat for a pair of compression springs 476 and 478 which are disposed in the chamber 468 and engage the bottom of the chamber 468 and the closure plug 470 respectively. The springs yieldingly retain the pin in its intermediate vertical position, which is the rest or inoperative position of the pin, and tend to yieldingly return the pin to this position when it is displaced therefrom.

Diametrically opposite the slot 472, the gauging pin has a latching recess 480. A latch lever 482 pivotally mounted in the slot 464 by a pivot pin 484, has a ball detent 486, yieldingly biased by a spring 488 housed in a chamber 490, which ball detent is adapted to seat in a detent recess of the gauge pin.

A latch actuating lever 492 is fulcrumed at 494 intermediate its ends to a fulcrum support or bracket 496 mounted upon the gauge blade 204 and has a downturned forward end 498 extending into the slot 464 and pivoted at 500 to the latch lever 482. At its other end, the actuating lever 492 has a pivotal connection 502, see Figure 5, with the upper end of a tilting rod, not shown, which extends through the support post 44 and which as set forth in my Patent No. 2,841,400 controls the tilting of the tone arm between its upper and lower record playing positions.

Figures 14, 15:
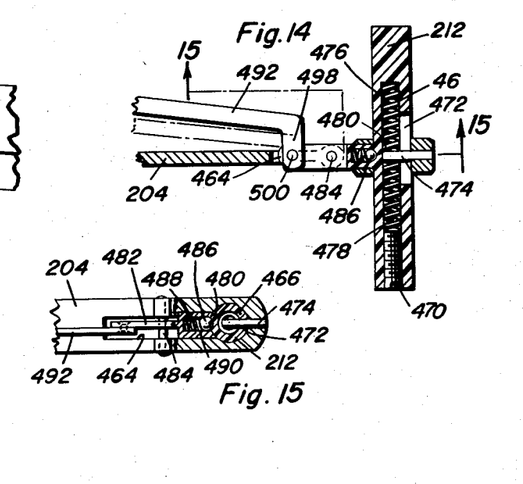
Figure 14 is a detail view taken in vertical section substantially upon the plane indicated by the section line 14—14 of Figure 5, and showing structural details of the gauging roller and its mounting.
Figure 15 is a detail view taken in horizontal section substantially upon the plane indicated by the broken section line 15—15 of Figure 14.

The operation of the latching mechanism and its effect upon the functioning of the gauging pin 212 are as follows:

The gauging pin length is less than the distance between the adjacent surfaces of records 18 and 34, see Figure 2, resting upon the supporting and driving assembly 26 and the turntable 16, so that when the gauging pin 212 is in its intermediate vertical position, as shown in full lines in Figure 14, and the tone arm is in its idle or horizontal position, the tone arm and pin can freely swing inward towards the turntable spindle without the pin contacting either record.

When the record player prepares to play a record, the control mechanism, either manually or automatically operated, vertically elevates or lowers the tilting rod, not shown, to both tilt the tone arm and actuate the latch actuating lever 492.

The tilting of the latch actuating lever 492 in turn causes a vertical pivoting of the latch lever 482 from its rest position, shown in full lines in Figure 14 to a tilted position in either direction, one of which is shown in dotted lines in Figure 14. When the latch lever tilts, the yielding engagement of the detent member 486, whether ball or plunger, with the recess 480 of the gauging pin 212 is sufficient to vertically raise or lower the latter in its bore 466. Thus, as the tilting rod is raised in the initial position of its movement in preparation for upward tilting of the tone arm to a position in which it will engage the bottom side of the record 18 in Figure 2, the gauging pin 212 is elevated so that it will engage a record 18 when the tone arm is horizontally swung inwards towards the spindle. Conversely, when the tilting rod is lowered in preparation for downward tilting of the tone arm to a position in which it will engage the top side of the record 34 in Figure 2 and Figure 20, the gauging pin is likewise lowered so that it will engage a record 34 when the tone arm is moved horizontally inwards.

The resilient movement of the detent member 486 is sufficient to maintain a driving contact in the recess 480 during their limited tilting of the latch lever in the initial portion of the tilting of the tone arm by the tilting rod, whereby the gauging pin will be shifted to its proper gauging position, either up or down, against the bias of its return springs 476 and 478.

However, upon the completion of the gauging and indexing operation, when the tone arm is indexed and ready to set down upon the sound track, the final vertical travel, either up or down, of the tilting rod is completed. This further travel of the latter, through the levers 492 and 482, imparts a still further arcuate travel to the detent member 486 withdrawing the latter from the recess 480 and permitting the return spring to restore the gauging pin to its idle position of Figure 14, permitting the tone arm to complete its tilting to the final stylus setdown position without interference from the gauging pin.

Although the pin 212 illustrated may be used, it is also possible to mount rollers or sleeves thereon at its opposite ends, as by anti-friction bearings, if desired.

A connecting means is provided for operatively connecting the rearwardly extending end of the gauging blade and its arm 228 with the limit lever 156. The limit lever has oscillating movement in a horizontal plane, while the arm 228 has both a horizontal oscillating movement in conjunction with the tone arm and also a tilting movement therewith. The connecting means is therefore devised to permit these relative motions between the arm 228 and the limit lever 156.

The lower end of the arm 228 is vertically slotted at 250, see Figure 8, and slidably received therein is the laterally enlarged upper end 252 of a vertical arm 254. The latter has a horizontal extending member 256 which is provided with a pivotal connection 258 by which it is connected to a rod 260.

Figure 16:
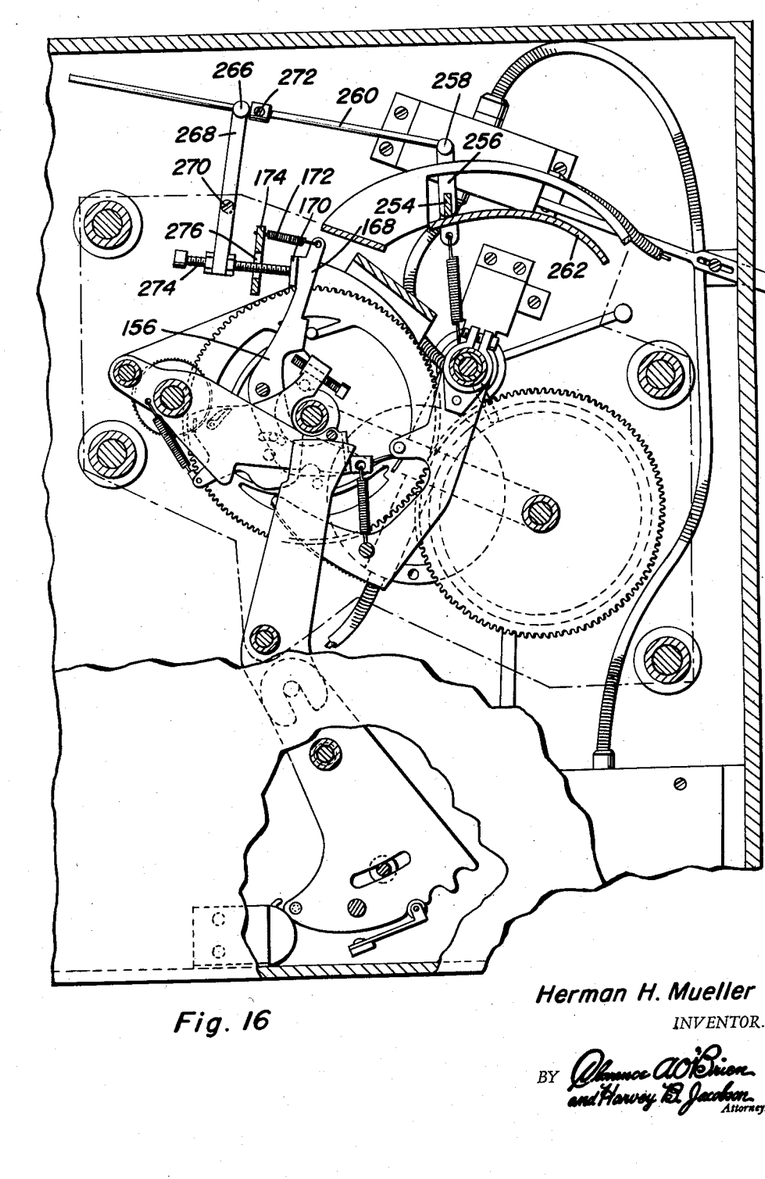
Figure 16 is a fragmentary horizontal sectional view through mechanism in the cabinet of the record player showing details of the tilting, horizontal and vertical movements of the mechanism.

Suitably supported in the cabinet 10 is an arcuate guide or abutment surface 262 which is concentric with the axis of rotation of the tone arm support post 44. A vertical edge of the vertical arm 254 is adapted to ride upon the convex surface of this abutment surface, being yieldingly retained thereagainst as by a tension spring 264 secured in any suitable manner and positioned to the horizontal member 256 and any convenient portion of the record player. The horizontal member 256 is suitably guided to thus maintain the element 254, 256, in proper position. As so far described, it will be apparent that upon horizontal swinging movement of the tone arm, the arm 228 and the member 254 will be moved arcuately therewith about the vertical axis of the tone arm support post. This movement in turn will cause longitudinal movement of the rod 260 which slidably extends through an apertured swivelling connection 266, at one end of a lever 268 journaled on a vertical pivot 270. An adjustable collar 272, see Figure 16, may be mounted upon the rod 260 to adjust the operative relationship of the same with the lever 268.

At the other end of the lever 268, from its pivot pin 270, the same is provided with an adjusting screw 274 which extends through a convenient opening 276 in the bracket 174 and into abutting engagement with the actuated flange 170 upon the limit lever 156; or the flange 168 of the modified limit lever 155, if the latter is used. It will thus be apparent as the tone arm swings horizontally, through the above described connecting means, a corresponding movement is imparted to the limit lever 156 or 155 and such movement of the limit lever will appropriately position the stop flange 160 on the lever 156 or one of the recesses or notches on the lever 155 into operative relation with the pin 152 on the swing lever 150.

The operating of the adjusting mechanism of the index device is as follows: Assume that a stack of records 22 has been placed upon the spindle in the position of Figure 2 and the record player has been started. The lowermost record 24 is lowered from the stack in the usual manner, being placed upon the supporting and driving assembly 26, as at 18, with the pressure arm assembly 28 being then applied thereto. The gauging pin is now elevated by the tilting rod when the latter is raised by the control mechanism of the record player. The tone arm, in the position shown in Figure 1 and with the gauging device in the reset position shown in that figure now moves from its rest position inward towards the record until the elevated gauge pin 212 engages the rim of the record shown in the position 18 as mounted upon the supporting and driving assembly 26. As this point is reached, the actual gauging operation begins.

As the tone arm and the gauging blade continue to move inward, the pressure of the gauging pin 212 against the record 18 causes the gauge blade and its guide 218 to move from the position of Figure 1, the gauge blade guide being forcibly released from the resilient detent means 234, 226 until the detent ball 234 is seated in the detent opening 236. At this time, the blade is in completely collapsed position with the gauge pin 212 being now received in the recess 216 in the tone arm, and the stylus or needle of the tone arm being now disposed in properly indexed position above the beginning of the sound track groove on the top side of the record 18. During this portion of the operation, the gauge mechanism functions as set forth above.

Figure 3:
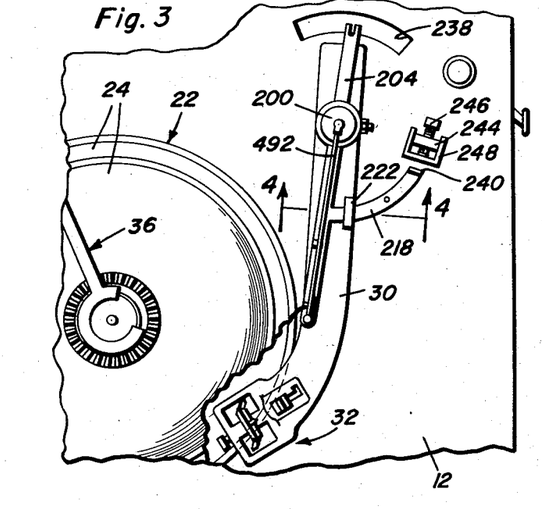
Figure 3 is a fragmentary view of a position of Figure 1 but showing the tone arm and the gauging device in the position which they assume upon the completion of the gauging operation, and after the horizontal movement has been adjusted thereby in accordance with the size of the record as determined by the gauging operation for indexing the tone arm.

As the gauge moves inwardly or collapses upon the tone arm, the gauge blade arm 228 with its connecting means has appropriately shifted the limit lever to position the proper portion of the flange 160 of the limit lever 156 or the recesses or notches 162, 164, or 166, of the limit lever 155, in position to engage the pin 152 of the horizontal swing lever and thus limit inward travel of the tone arm to the proper indexed position for playing that particular record. It will be evident that the extent of the inward travel of the tone arm, from its rest position, shown in Figure 1, to the completion of the gauging operation, shown in Figure 3, is proportionate to the size of the record contacted by the gauge blade pin and consequently the adjustment of the limit lever will also be proportionate to the record size. Consequently, the stop surfaces of the limit lever will be appropriately positioned so that they will be engaged by the swing lever 152, thus halting the swing lever and the tone arm in proper position for the set down of the stylus upon the sound groove of that particular record. After the record has been gauged and played in the above described manner, and the tone arm withdrawn, the pressure assembly is lifted, the record is lifted, the supporting and driving assembly 26 is withdrawn and the record is lowered to the turntable into the position shown at 34. The assembly 26 is then replaced, a new record lowered thereon, the pressure assembly 28 then applied, the tone arm is then reintroduced repeating the gauging operation on the record which is now indicated at 34, and then tilted downward to play the upper sound groove of the record upon the turntable.

It will thus be apparent that each record is gauged and the tone arm indexed for that record before the tone arm is tilted into playing position and before the record is played.

It will be observed that the above described construction and operation of the gauging device enables the gauging operation to be effectively performed each time the tone arm moves in from its rest position; and is not effected by the size of the records 18 or 34, since the initial part of the tone arm tilting movement is effective to cause the gauging pin 212 to be extended into operative gauging position towards the record, either 18 or 34, which it is desired to gauge and play.

*Modified gauging device of Figures 10–13*

While in general the above described form of gauging device disclosed hereinafter, is considered to be superior in view of its greater range of use and adaptability to various constructions of record players, the simpler and less expensive modified embodiment of Figures 10–13 may be deemed preferable for certain particular structural arrangements in a record player.

The modified arrangement is shown in Figures 10–13 as being applied to the same construction of tone arm 30 and needle changer assembly 32 previously described in detail and has the tone arm mounted upon the support post 44 in the same manner and for the same functions. There is also provided the same tilting rod tilting pin 108 engaging the tone arm bracket 110 for effecting tilting of the tone arm in the manner set forth in my prior Patent No. 2,841,400.

It will be further noted that the cabinet top wall 12 likewise has the support post bushing 92 and the arcuate slot 238 to receive the connection between the modified gauging device on the tone arm and the indexing device, previously described, which is mounted within the cabinet and associated with the horizontal movement to adjust the limit lever for indexing the tone arm.

A support bracket 508 extends laterally from a side wall of the tone arm upon its rear side which is the side remote from the turntable, and carries a vertically disposed fulcrum pin 510 by which a connecting lever 512 is pivoted adjacent one end of the tone arm. The lever 512 is thus mounted for horizontal swinging movement towards and from the tone arm, its longer leg being provided at its rear end with a downwardly extending member 514 which may be identical with the element 228 previously described, is connected to the member 252 in the same manner and performs the same functions.

The side walls of the tone arm are provided with guide slots 516 and the connecting lever 512 has an arcuate guide blade 518 slidably and guidably received therein, thereby restraining the lever 512 against vertical movement relative to the tone arm.

Upon the rear side wall of the tone arm, adjacent the enlarged head which houses and forms a part of the needle changer assembly 32, there is mounted a second lateral fulcrum bracket 520 carrying a vertical fulcrum pin 522 by which the mid-portion of an actuating lever 524 is journaled for horizontal swinging movement. The adjacent ends of the levers 512 and 524 are interconnected by means of an upstanding vertical pin 526 on the end of the lever 512 which is loosely but operatively received in the forked or slotted portion 528 of the lever 524.

Figure 13:
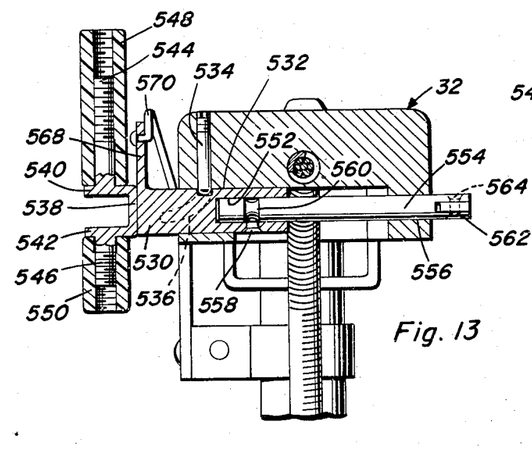
Figure 13 is a vertical transverse sectional detail taken upon an enlarged scale substantially upon the plane indicated by the section line 13—13 of Figure 10 and showing the mounting of the modified gauging device.

Referring now to Figure 13, it will be seen that a rod or sleeve 530 is journaled in a horizontal bore 532 extending into the forward side of the needle changer assembly 32, being releasably, rotatably and slidably secured by a set screw 534 in the top of the tone arm which is seated in a circumferentially and axially extending spiral groove 536 in the rod 530. At its outer end the rod has a U-shaped extension 538 which may be either integral therewith or rigidly mounted thereon and which includes parallel plates 540, 542, having oppositely disposed screw threaded axles 544 and 546 integrally or rigidly mounted thereon. A pair of internally threaded sleeves 548 and 550, preferably of a resilient material such as rubber or plastic, are threaded upon the axles as gauging elements. It will be observed that the gauge sleeve 548 is longer than the sleeve 550 in order to enable the same to gauge the record 18.

The extremity of the rod 530 which is disposed within the tone arm head, has an open axial bore or chamber 552 in which is rotatably journaled the inner end of a shaft 554 which extends through the opposite side wall of the head, being journaled in a bearing bore 556 therein. A retaining pin or set screw 558 extends through the wall of the rod 530 into the bore 552 and engages in a circumferential groove or channel 560 to thereby prevent relative axial movement but permit relative rotation between the rod 530 and shaft 554.

At its outer end, the shaft 554 is bifurcated or slotted at 562 and carries a pivot pin 564 which is received in a slot 566 provided in the end of the actuating lever 524 which is received in the slot 562 whereby the lever is operatively connected to the shaft 554, rod 530 and gauge elements 548 and 550.

Adjacent the U-shaped member 538, the rod 530 has a crank arm 568 to which is pivotally connected the angularly deposed end 570 of a connecting link or rod 572. The latter is positioned along the forward side wall of the tone arm and at its other extremity is angulated at 574 for pivotal engagement with the upper end of a lever 576. At its lower end, the lever 576 is pivoted at 578 to a laterally extending mounting bracket 580 secured fixedly and in proper position to the tone arm support post 44, below the tone arm, by a clamp 582. A set screw or the like 584 is employed to detachably and adjustably secure the clamp upon the support post. An elongated slot 586 is disposed in the latches 576 intermediate the ends of the latter, as shown in Figure 10, and a lateral pin 588.

It should be especially observed that the pivotal connections 574 and 578 of the latch are disposed on opposite sides of the horizontal axis of the pivot pin 590 about which the tone arm tilts and the pin 588 is also displaced from the pin 590. The pivot pin 588 may be identical with the trunnions 46 described and illustrated hereinbefore. It will also be now understood that the level 576 will now move vertically and will move horizontally with the tone arm because of its fixed but adjustable mounting upon the tone arm support post. However, when the tone arm tilts, in order to set down on a sound track, the relative location of the pins and pivots will result in a pivotal movement of the lever 576.

Figure 10:
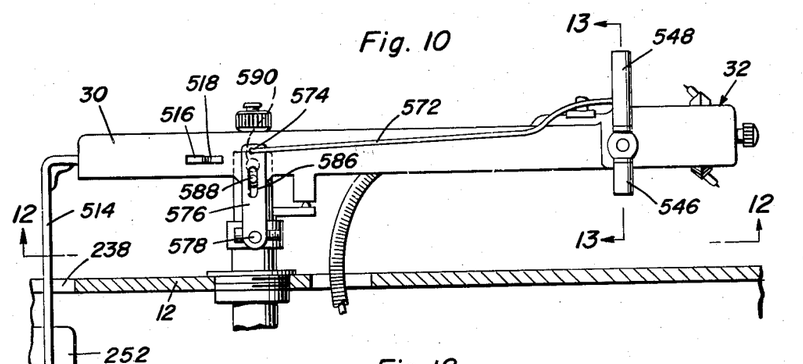
Figure 10 is a vertical sectional detail view showing in elevation the tone arm and a modified form of gauging device applied thereto.
Figure 11:
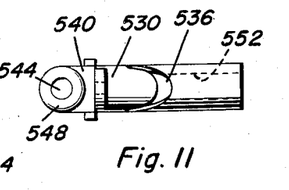
Figure 11 is a perspective view of an element of the gauging device of Figure 10.
Figure 12:
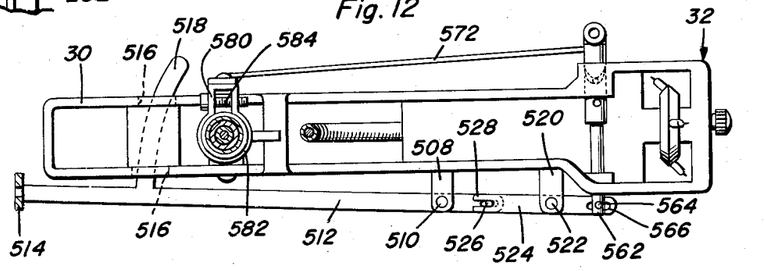
Figure 12 is a horizontal sectional view taken substantially upon the plane indicated by the section line 12—12 of Figure 10 and looking upwardly at the bottom of the tone arm and its gauging device.

As will be apparent from Figure 10, the downward clockwise tilting of the tone arm about its pivot 590 will cause a corresponding clockwise arcuate or oscillatory movement of the pin 588 about pivot 590. Since the pin 588 is slidable in the slot 586, it will move towards the left, imparting a counter clockwise movement to the lever 576 about its pivot 578. This in turn, through the connecting rod 572 and crank 568 will rotate the rod 530 moving the gauge elements 548 and 550 from the vertical gauging position of Figure 10 into a horizontal non-gauging position thereby retracting the elements within the top and bottom limits of the tone arm to permit the stylus to set down on a sound track without interference. An upward tilting of the tone arm will actuate the parts in a reverse direction, but the rod 530 will again rotate through substantially 90°, but in the oppisite direction, to retract the gauge elements. The above described retracting actions, however, do not occur until the tone arm has been indexed and is tilting for its set down on the sound track.

In the indexing operation, the tone arm approaches the record, 18 or 34 which it is desired to gauge. As the gauge elements in the vertical gauging position of Figures 10, 12, 13, which is the position they assume when the tone arm is untilted, approach and contact the rim of a record, the further inward swing of the tone are pushes the rod 530 towards the right in Figure 13, into the tone arm head. This axial movement, due to the engagement of the set screw 534 in the spiral groove 536 rotates the rod and through the pin 558 and groove 560 moves the shaft 554 axially towards the right.

The axial outward travel of the shaft 554 oscillates the lever 524 which in turn swings the lever 512 to operate the limit lever 155 or 156 in the manner and by the structure described in detail in connection with the preceding embodiment. The lever system 524, 512 gives an amplified movement to the member 514.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to falling within the scope of the appended claims.

What is claimed as new is as follows:

1. In an automatic phonograph record player, means for supporting and rotating a record, a tone arm, means mounting said tone arm for vertical and horizontal swinging movement, and indexing means for limiting the horizontal movement of the tone arm towards the center of a record to be played, a gauge movably mounted on and slidable upon the top surface of said tone arm for contacting the rim of said record to be played, said gauge including a gauge element projecting vertically above and below the tone arm, means connecting said gauge to said indexing means for adjusting the latter in conformity to the size of the said record to be played, including means for vertically tilting said tone arm for setting its needle in a sound track of a record, said gauge having a gauge element mounted for vertical movement relative to the tone arm into gauging and non-gauging position, means responsive to initial tilting of said tone arm for moving said gauge element into its gauging position.

2. In an automatic phonograph record player, means for supporting and rotating a record, a tone arm, means mounting said tone arm for vertical and horizontal swinging movement, and indexing means for limiting the horizontal movement of the tone arm towards the center of a record to be played, a gauge movably mounted on and slidable upon the top surface of said tone arm for contacting the rim of said record to be played, said gauge including a gauge element projecting vertically above and below the tone arm, means connecting said gauge to said indexing means for adjusting the latter in conformity to the size of the said record to be played, including means for vertically tilting said tone arm for setting its needle in a sound track of a record, said gauge having a gauge element mounted for vertical movement relative to the tone arm into gauging and non-gauging positions, means responsive to final tilting of the tone arm for moving said gauge element into its non-gauging position.

3. In an automatic phonograph record player, means for supporting and rotating a record, a tone arm, means mounting said tone arm for vertical and horizontal swinging movement, and indexing means for limiting the horizontal movement of the tone arm towards the center of a record to be played, a gauge movably mounted on and slidable upon the top surface of said tone arm for contacting the rim of said record to be played, said gauge including a gauge element projecting vertically above and below the tone arm, means connecting said gauge to said indexing means for adjusting the latter in conformity to the size of the said record to be played, including means for vertically tilting said tone arm for setting its needle in a sound track of a record, said gauge having a gauge element mounted for vertical movement relative to the tone arm into gauging and non-gauging positions, means responsive to the initial position of the tilting of the tone arm for moving the gauge element into gauging position and further responsive to the final position of the tilting of the tone arm for moving the gauge element into its non-gauging position.

4. In a phonograph record player, a support post, a tone arm mounted upon said support post for vertical tilting movement upwardly and downwardly, needles projecting upwardly and downwardly from said tone arm for playing the top and bottom sides of records when the latter are supported and rotated in vertically spaced horizontal planes, means for selectively tilting said tone arm upwardly and downwardly, means for horizontally swinging said tone arm, indexing means limiting the last mentioned means for positioning said tone arm needle at the beginning of a sound track of different sizes of records, gauging means carried by said tone arm and having a gauge pin extending vertically above and below the tone arm for engaging the rim of a record to be played when the latter is in either of two vertically spaced positions for playing, connecting means responsive to engagement of said last means with the rim of a record for actuating said indexing means, said gauging means including a gauge blade mounted on said tone arm for horizontal swinging movement, a gauge element mounted on said blade for selective vertical movement from a non-gauging position into upper and lower gauging positions and means for moving said element between the gauging and non-gauging positions.

5. In a phonograph record player, a support post, a tone arm mounted upon said support post for vertical tilting movement upwardly and downwardly, needles projecting upwardly and downwardly from said tone arm for playing the top and bottom sides of records when the latter are supported and rotated in vertically spaced horizontal planes, means for selectively tilting said tone arm upwardly and downwardly, means for horizontally swinging said tone arm, indexing means limiting the last mentioned means for positioning said tone arm needle at the beginning of a sound track of different sizes of records, gauging means carried by said tone arm and having a gauge pin extending vertically above and below the tone arm for engaging the rim of a record to be played when the latter is in either of two vertically spaced positions for playing, connecting means responsive to engagement of said last means with the rim of a record for actuating said indexing means, said gauging means including a gauge blade mounted on said tone arm for horizontal swinging movement, a gauge element mounted on said blade for selective vertical movement from a non-gauging position into upper and lower gauging positions and means for moving said element between the gauging and non-gauging positions, said blade having a vertical bore, said element being retained in said bore.

6. In a phonograph record player, a support post, a tone arm mounted upon said support post for vertical tilting movement upwardly and downwardly, needles projecting upwardly and downwardly from said tone arm for playing the top and bottom sides of records when the latter are supported and rotated in vertically spaced horizontal planes, means for selectively tilting said tone arm upwardly and downwardly, means for horizontally swinging said tone arm, indexing means limiting the last mentioned means for positioning said tone arm needle at the beginning of a sound track of different sizes of records, gauging means carried by said tone arm and having a gauge pin extending vertically above and below the tone arm for engaging the rim of a record to be played when the latter is in either of two vertically spaced positions for playing, connecting means responsive to engagement of said last means with the rim of a record for actuating said indexing means, said gauging means including a gauge blade mounted on said tone arm for horizontal swinging movement, a gauge element mounted on said blade for selective vertical movement from a non-gauging position into upper and lower gauging positions and means for moving said element between the gauging and non-gauging positions, said blade having a vertical bore, said element being retained in said bore, resilient means yieldingly urging said element to its non-gauging position.

7. In a phonograph record player, a support post, a tone arm mounted upon said support post for vertical tilting movement upwardly and downwardly, needles projecting upwardly and downwardly from said tone arm for playing the top and bottom sides of records when the latter are supported and rotated in vertically spaced horizontal planes, means for selectively tilting said tone arm upwardly and downwardly, means for horizontally swinging said tone arm, indexing means limiting the last mentioned means for positioning said tone arm needle at the beginning of a sound track of different sizes of records, gauging means carried by said tone arm and having a gauge pin extending vertically above and below the tone arm for engaging the rim of a record to be played when the latter is in either of two vertically spaced positions for playing, connecting means responsive to engagement of said last means with the rim of a record for actuating said indexing means, said gauging means including a gauge blade mounted on said tone arm for horizontal swinging movement, a gauge element mounted on said blade for selective vertical movement from a non-gauging position into upper and lower gauging positions and means for moving said element between the gauging and non-gauging positions, said blade having a vertical bore, said element being retained in said bore, resilient means yieldingly urging said element to its non-gauging position, said resilient means being disposed within said element.

8. In a phonograph record player, a support post, a tone arm mounted upon said support post for vertical tilting movement upwardly and downwardly, needles projecting upwardly and downwardly from said tone arm for playing the top and bottom sides of records when the latter are supported and rotated in vertically spaced horizontal planes, means for selectively tilting said tone arm upwardly and downwardly, means for horizontally swinging said tone arm, indexing means limiting the last mentioned means for positioning said tone arm needle at the beginning of a sound track of different sizes of records, gauging means carried by said tone arm and having a gauge pin extending vertically above and below the tone arm for engaging the rim of a record to be played when the latter is in either of two vertically spaced positions for playing, connecting means responsive to engagement of said last means with the rim of a record for actuating said indexing means, said gauging means including a gauge blade mounted on said tone arm for horizontal swinging movement, a gauge element mounted on said blade for selective vertical movement from a non-gauging position into upper and lower gauging positions and means for moving said element between the gauging and non-gauging positions, said blade having a vertical bore, said element being retained in said bore, said moving means including a latch lever pivoted on said blade and operatively engaging said element, means responsive to tilting of said tone arm in either direction for operating said latch lever and element for movement in the same direction.

9. In a phonograph record player, a support post, a tone arm mounted upon said support post for vertical tilting movement upwardly and downwardly, needles projecting upwardly and downwardly from said tone arm for playing the top and bottom sides of records when the latter are supported and rotated in vertically spaced horizontal planes, means for selectively tilting said tone arm upwardly and downwardly, means for horizontally swinging said tone arm, indexing means limiting the last mentioned means for positioning said tone arm needle at the beginning of a sound track of different sizes of records, gauging means carried by said tone arm and having a gauge pin extending vertically above and below the tone arm for engaging the rim of a record to be played when the latter is in either of two vertically spaced positions for playing, connecting means responsive to engagement of said last means with the rim of a record for actuating said indexing means, said gauging means including a gauge blade mounted on said tone arm for horizontal swinging movement, a gauge element mounted on said blade for selective vertical movement from a non-gauging position into upper and lower gauging positions and means for moving said element between the gauging and non-gauging positions, said moving means being responsive to tilting of said tone arm both upwardly and downwardly.

10. In a phonograph record player, a support post, a tone arm mounted upon said support post for vertical tilting movement upwardly and downwardly, needles projecting upwardly and downwardly from said tone arm for playing the top and bottom sides of records when the latter are supported and rotated in vertically spaced horizontal planes, means for selectively tilting said tone arm upwardly and downwardly, means for horizontally swinging said tone arm, indexing means limiting the last mentioned means for positioning said tone arm needle at the beginning of a sound track of different sizes of records, gauging means carried by said tone arm and having a gauge pin extending vertically above and below the tone arm for engaging the rim of a record to be played when the latter is in either of two vertically spaced positions for playing, connecting means responsive to engagement of said last means with the rim of a record for actuating said indexing means, said gauging means including a gauge blade mounted on said tone arm for horizontal swinging movement, a gauge element mounted on said blade for selective vertical movement from a non-gauging position into upper and lower gauging positions and means for moving said element between the gauging and non-gauging positions, said blade having a vertical bore, said element being retained in said bore, said moving means including a latch lever pivoted on said blade and operatively engaging said element, means responsive to tilting of said tone arm in either direction for operating said latch lever and element for movement in the same direction, said blade having a slot intersecting said bore, said latch lever being pivoted in said slot.

11. In a phonograph record player, a support post, a tone arm mounted upon said support post for vertical tilting movement upwardly and downwardly, needles projecting upwardly and downwardly from said tone arm for playing the top and bottom sides of records when the latter are supported and rotated in vertically spaced horizontal planes, means for selectively tilting said tone arm upwardly and downwardly, means for horizontally swinging said tone arm, indexing means limiting the last mentioned means for positioning said tone arm needle at the beginning of a sound track of different sizes of records, gauging means carried by said tone arm and having a gauge pin extending vertically above and below the tone arm for engaging the rim of a record to be played when the latter is in either of two vertically spaced positions for playing, connecting means responsive to engagement of said last means with the rim of a record for actuating said indexing means, said gauging means including a gauge blade mounted on said tone arm for horizontal swinging movement, a gauge element mounted on said blade for selective vertical movement from a non-gauging position into upper and lower gauging positions and means for moving said element between the gauging and non-gauging positions, said blade having a vertical bore, said element being retained in said bore, said moving means including a latch lever pivoted on said blade and operatively engaging said element, means responsive to tilting of said tone arm in either direction for operating said latch lever and element for movement in the same direction, said blade having a slot intersecting said bore, said latch lever being pivoted in said slot, said element having a latch recess, said latch lever being engaged in said recess when said element is in an intermediate vertical position and being disengaged when the element is moved to either extreme of its vertical movement.

References Cited in the file of this patent

UNITED STATES PATENTS

| 2,370,875 | Pressley | Mar. 6, 1945 |
| 2,549,272 | Wennerbo | Apr. 17, 1951 |
| 2,601,986 | James | July 1, 1952 |
| 2,628,843 | Comstock | Feb. 17, 1953 |
| 2,729,455 | Mueller | Jan. 3, 1956 |
| 2,818,263 | Dale | Dec. 31, 1957 |

FOREIGN PATENTS

| 110,392 | Sweden | Apr. 18, 1944 |
| 901,525 | France | July 30, 1945 |
| 1,060,075 | France | May 30, 1954 |